United States Patent

[11] 3,586,777

[72] Inventor Gerhard Kamin
Traisa, Darmstadt, Germany
[21] Appl. No. 853,780
[22] Filed Aug. 28, 1969
[45] Patented June 22, 1971
[73] Assignee Fernseh GmbH
Darmstadt, Germany
[32] Priority Sept. 7, 1968
[33] Germany
[31] P 17 62 841.0

[54] METHOD AND ARRANGEMENT FOR GENERATING A GATING PULSE
12 Claims, 2 Drawing Figs.

[52] U.S. Cl. .......... 178/69.5 TV, 178/6.6 A
[51] Int. Cl. .......... H04n 5/04
[50] Field of Search .......... 178/6.6 A, 69.5 TV, 5.6; 307/269, 293; 328/63

[56] References Cited
UNITED STATES PATENTS

| | | | |
|---|---|---|---|
| 2,955,157 | 10/1960 | Young | 178/6.6 A |
| 3,485,950 | 12/1969 | Reiser | 178/69.5 TV |
| 3,501,584 | 4/1970 | Machein et al. | 178/6.6 A |

*Primary Examiner*—Robert L. Griffin
*Assistant Examiner*—Richard P. Lange
*Attorney*—Michael S. Striker

ABSTRACT: Vertical frequency pulses in a television signal are frequency divided by a factor of two. In response to a control signal, a first timing signal is generated extending for a time slightly exceeding the length of time corresponding to a frame in the television signal. The frequency divided signal and the first timing signal are fed to the inputs of a series combination of AND gate and inverter. The trailing edge of the output pulse furnished by the series combination triggers a monostable multivibrator whose output pulse extends for the same time as the first timing signal. This pulse and the frequency divided pulses are again fed to an AND gate-inverter combination whose output triggers a third monostable multivibrator.

Inventor:
Gerhard Kamin
by Michael P. [signature]
Attorney

Inventor:
GERHARD KAMIN
By: Michael S. Striker,
Attorney

METHOD AND ARRANGEMENT FOR GENERATING A GATING PULSE

BACKGROUND OF THE INVENTION

This invention relates to a method and arrangement for generating a gating pulse in response to a control signal applied at an arbitrary time. In particular, it relates to the generation of such a gating pulse in synchronism with the interpulse interval in a pulse sequence having a substantially constant pulse repetition rate and interpulse interval. For purposes of this application, the interpulse interval is defined as the time from the trailing edge of one pulse to the leading edge of the subsequent pulse. Even more particular, the invention relates to the generation of such a gating pulse in synchronism with the fields in a television signal, and extending for a time period corresponding to such a field. In the processing of video signals, for example in the evaluation of a television arrangement by means of a computer, the problem often arises to select only predetermined portions of the television signal for furnishing to the computer. Thus it may, for example, be required to furnish that part of a television signal corresponding to a single field. The signal must be furnished in response to a control signal which may be generated at an arbitrary time, for example by the computer when said computer is ready to receive the information contained in the television signal.

SUMMARY OF THE INVENTION

This invention thus comprises a method and arrangement for furnishing gating signals upon receipt of a control signal. These gating signals start substantially simultaneously with the interpulse interval in a pulse sequence having a substantially constant pulse repetition rate and interpulse interval. The method in accordance with this invention comprises generating a first timing signal in response to said control signal, said timing signal having a pulse width slightly exceeding twice the pulse repetition time in said pulse sequence. The pulse sequence is frequency divided by a factor of two, furnishing a half-frequency pulse sequence. A second pulse is then generated upon substantially simultaneous occurrence of said first timing signal and a pulse in said half-frequency pulse sequence. The trailing edge of the second pulse is used to cause the generation of a second timing signal having a pulse width corresponding to the pulse width of said first timing signal. A third pulse is then generated upon substantially simultaneous occurrence of said second timing pulse and a pulse in said half-frequency pulse sequence. The trailing edge of the third pulse is then used for starting the generation of the gating pulse. The time duration of the gating pulse may, for example, correspond to the interpulse interval in the original pulse sequence. If the original pulse sequence is a sequence of the vertical frequency pulses in a television signal, the so-generated gating pulse can then be used to gate from the television signal the signals corresponding to an individual field.

The method according to the invention makes it possible for a small capital outlay to derive a pulse which opens a gate circuit, through which the video signal is passed, at the beginning of a field and closes it again at the end of the same field. The pulse appears at latest one frame period after the control signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
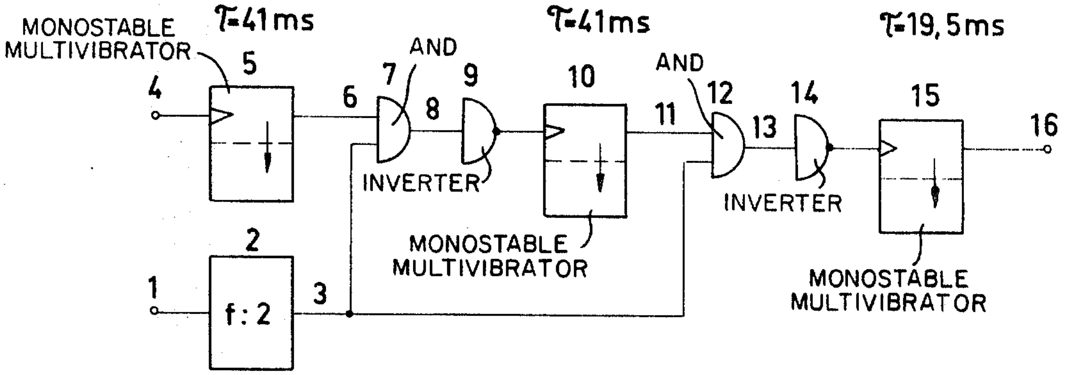
FIG. 1 is a circuit arrangement for performing the method according to the invention.
Figure 2:
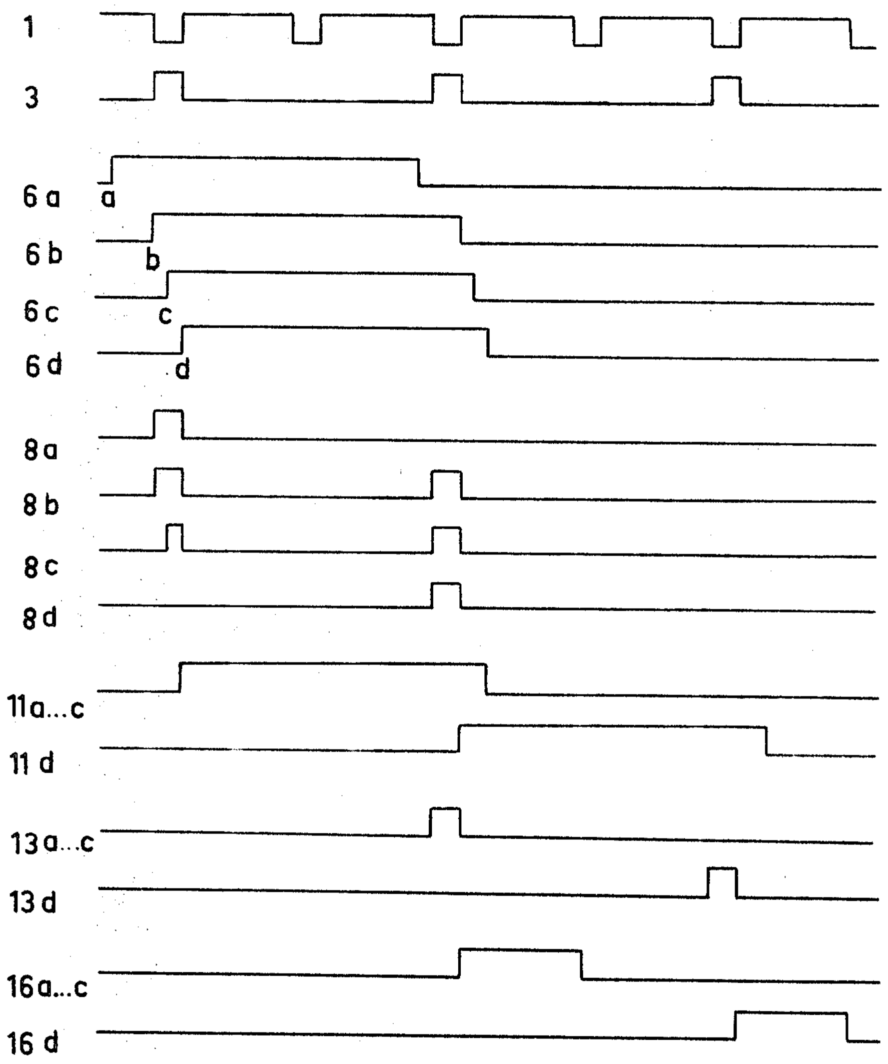
FIG. 2 shows the voltage plotted against time at various points in the circuit of FIG. 1.

In the circuit arrangement according to FIG. 1, vertical frequency pulses at field frequency are delivered at the point 1. In the frequency divider 2, each second one of these pulses is suppressed to form a half-frequency pulse sequence. The waveforms of these pulses are shown in lines 1 and 3 of FIG. 2, respectively, for the vertical frequency pulses and the frequency divided pulses. The term vertical frequency pulses herein in general means a train of pulses whose frequency is equal to the field frequency and in which the interpulse intervals are each equal to the duration of and occur simultaneously with the scanning of a single field. The pulses may be derived from the scanner, or may be the same pulses as control the scanner. In this example, the pulses are defined by the relatively negative portions of the waveform of line 1, FIG. 2, and the intervals therebetween by the relatively positive portions. As is evident from FIG. 2, a reversal of polarity takes place in the frequency divider. At the point 4 of the circuit arrangement, the control signal is delivered, for example in the form of a short pulse or a voltage step. The control signal switches the monostable multivibrator 5, the first timing pulse-generating means, into its unstable state. After a time duration which is somewhat greater than the period of one full frame (i.e., twice the period of the vertical frequency pulse waveform), this multivibrator regains its stable condition. In the case of 50 fields per second, the pulse duration of the output signal of the monostable multivibrator 5 therefore is about 41 msec. Lines *6a* to *6d* of FIG. 2 show the first timing signals; namely the output signals of the monostable multivibrator 5, which begin at various points in time depending upon the instant at which the control signals appeared, indicated by the letters *a*, *b*, *c* and *d*.

The AND circuit 7 delivers a signal only upon coincidence of signals at 3 and 6. Therefore, at the output of the AND circuit 8 will appear the pulses indicated in the lines *8a* to *8d* of FIG. 2, corresponding to the pulses shown in *6a* to *6d*. In the examples *a*,*b* and *c*, the control signal appears before the trailing edge of the first pulse in the half-frequency pulse sequence shown at line 3. Accordingly, there will result the pulses shown to the left in lines *8a*, *8b* and *8c*. However, in line *8a*, only one pulse appears because the pulse shown in line *6a* has already ended before the second pulse in line 3 begins.

In the examples b and c, the release signal occurs later so that two pulses appear at the output of the AND circuit. In the example *d*, the release signal appears after the trailing edge of the first pulse shown in line 3 so that only one pulse (*8d*) appears at the output of the AND circuit 7.

The output signal of the AND circuit 7 is delivered through an inverter circuit 9 whose output is herein referred to as a second pulse, to the monostable multivibrator herein referred to as second timing signal furnishing means. By the introduction of the inverter stage 9, the monostable multivibrator 10 is switched from the stable state into the unstable state by the trailing edges of the pulses shown in lines *8a* to *8d*, so long as this multivibrator was not already in its unstable condition. The time constant of the monostable multivibrator 10 amounts to 41 msec., similar to that of monostable multivibrator 5, in the case of a field frequency of 50 cycles per second. In the lines *11a* to *11c*, there is shown the output signal of the monostable multivibrator in the case when the control signal appears before the trailing edge of the first pulse shown in line 3. If this control signal occurs later, then, at the output of the monostable multivibrator 10, there will appear the pulse shown in line *11d*, which is displaced by a full frame period. Upon coincidence of the output pulse of monostable multivibrator 10 and a pulse from the frequency divider 2, there will appear a pulse at the output of the AND circuit 12. This pulse is shown, for the cases *a* to *c* in lines *13a* to *13c* and is shown for case *d* in line *13d*. Finally, the output passes through inverter 14 to the monostable multivibrator 15, the third timing signal generating means, is actuated by the trailing edge of this pulse, the time constant of this multivibrator being equal to the duration of scanning of field, i.e., somewhat less than the field period, that is to say about 19.5 msec. when the field period is 20 msec., the field changing frequency being 50 cycles per second. From the lines 16 of FIG. 2, it is evident that the output pulse or gating pulse of the circuit arrangement according to FIG. 1, only embraces a single field and, according to the time instant of the appearance of the control signal, makes its appearance with a delay of one or two full frames with respect to said control signal.

A limiting case occurs if the control signal appears simultaneously with the trailing edge of a pulse shown in line 3 of FIG. 2. In this case, the left-hand pulses shown in lines *8b* and *8c* will be infinitely short. In this limiting case, it can occur that monostable multivibrator 10 is brought out of its stable state but does not go over into its unstable state but, on the contrary, returns to its stable state after a comparatively short time. In this case, two pulses will appear at the output of the monostable multivibrator, namely first of all a short pulse of small amplitude and, after a full frame period, a pulse of normal amplitude having the duration of a full frame.

However, in the method according to the invention, such a faulty operation of the circuit arrangement cannot make itself evident because the additional faulty pulse is not passed on by the AND circuit 12, because it appears only after the trailing edge of the pulse of line 3 of FIG. 2. Accordingly, the method according to the invention, makes it possible to avoid with certainty the appearance of two gating pulses after one control pulse, even in the case when the control pulse appears at an unfavorable point in time.

The performance of the method according to the invention is not restricted to the circuit arrangement shown in FIG. 1. For example, the circuit arrangement can be suitably converted by those skilled in the art by the use of NOR circuits instead of AND circuits.

While the invention has been illustrated and described as embodied in a particular circuit arrangement, it is not intended to be limited to the details shown, since various modifications, circuit changes and structural changes may be made without departing in any way from the spirit of the present invention.

What I claim as new and desire to be protected by Letters Patent is set forth in the appended.

1. Method for generating, upon receipt of a control signal, a gating pulse extending for a predetermined time interval and starting substantially simultaneously with the interpulse interval in a pulse sequence having a substantially constant pulse repetition rate and interpulse interval, comprising, in combination, the steps of generating a first timing pulse in response to said control signal, said first timing pulse having a pulse width exceeding, by a predetermined small amount, twice the pulse repetition time in said pulse sequence; frequency dividing said pulse sequence by a factor of two, thus furnishing a half-frequency pulse sequence; generating a second pulse in response to substantially simultaneous occurrence of said first timing pulse and a pulse in said half-frequency pulse sequence; generating a second timing pulse having a pulse width corresponding to the pulse width of said first timing pulse, in response to the trailing edge of said second pulse; generating a third pulse in response to substantially simultaneous occurrence of said second timing pulse and a pulse in said half-frequency pulse sequence; and generating said gating pulse in response to the trailing edge of said third pulse.

2. A method as set forth in claim 1, wherein said pulse sequence comprises the vertical frequency pulses in a television signal; and wherein said interpulse interval is the time of one field in said television signal.

3. A method as set forth in claim 2, wherein said predetermined time interval corresponds to the interpulse interval in said pulse sequence.

4. A method as set forth in claim 3 wherein said predetermined time interval is substantially equal to said interpulse interval.

5. A method as set forth in claim 4 wherein the pulse width of said first and second timing pulses are substantially equal.

6. An arrangement for generating, in response to a arbitrarily timed control signal, a gating pulse starting substantially simultaneously with the interpulse interval in a pulse sequence having a substantially constant pulse repetition rate and interpulse interval, comprising in combination, first timing pulse-generating means, for generating a first timing pulse in response to said control signal, said first timing pulse having a pulse width slightly exceeding twice the time interval between successive pulses in said pulse sequence; frequency divider means for dividing the frequency of said pulse sequence by a factor of two, thus furnishing a half-frequency pulse sequence; first logic circuit means for furnishing a second pulse upon substantially simultaneous occurrence of said first timing pulse and one of the pulses in said half-frequency pulse sequence; second timing pulse furnishing means for generating second-timing pulses in response to the trailing edge of said second pulse; second logic circuit means for furnishing a third pulse in response to substantially simultaneous occurrence of said second timing pulse and a pulse in said half-frequency pulse sequence; and third timing pulse generating means for furnishing said gating pulse in response to the trailing edge of said third pulse.

7. An arrangement as set forth in claim 6, wherein said first timing pulse-generating means comprises a monostable multivibrator adapted to be switched to the unstable state by said control signal, and further adapted to furnish said first timing signal when in said unstable state.

8. An arrangement as set forth in claim 6, wherein said second timing pulse furnishing means comprise a second monostable multivibrator adapted to be switched to the unstable state in response to the trailing edge of said second pulse, and adapted to generate said second timing pulse when in said unstable state.

9. An arrangement as set forth in claim 6, wherein said first logic circuit means comprise an AND circuit having a first input for receiving said first timing pulse, a second input for receiving said half-frequency pulse sequence, and an AND circuit output.

10. An arrangement as set forth in claim 9 further comprising an inverter circuit having an input connected to said AND circuit output and adapted to furnish said second pulse at an inverter output.

11. An arrangement as set forth in claim 6, wherein said second logic circuit means comprise an additional AND circuit having a first AND input connected to the output of said second timing pulse-furnishing means, a second AND input connected to the output of said frequency divider means and an additional AND circuit output.

12. An arrangement as set forth in claim 11, further comprising an additional inverter circuit having an additional inverter input connected to the output of said additional AND circuit, and an additional inverter output for furnishing said third pulse.